United States Patent
Smith et al.

[11] Patent Number: 6,072,963
[45] Date of Patent: Jun. 6, 2000

[54] CAMERA WITH CIRCUIT BOARD HAVING LIGHT BAFFLE OPENING

[75] Inventors: Stephen J. Smith, Shortsville; James D. Boyd, Rochester; Michael P. Cramer, Victor, all of N.Y.

[73] Assignee: Eastman Kodak Company, Rochester, N.Y.

[21] Appl. No.: 09/272,484

[22] Filed: Mar. 19, 1999

[51] Int. Cl.⁷ .................................................. G03B 17/00

[52] U.S. Cl. .......................................................... 396/542

[58] Field of Search .................................. 396/6, 535, 542

[56] References Cited

U.S. PATENT DOCUMENTS 5,727,246  3/1998  Hasuda et al. ..................... 396/542 X

*Primary Examiner*—Howard B. Blankenship
*Attorney, Agent, or Firm*—Roger A. Fields

[57] ABSTRACT

A camera comprising a front taking lens, an exposure chamber centered about an optical axis of the taking lens and having a rear backframe opening for exposing successive sections of a filmstrip, and a circuit board located between the taking lens and the backframe opening and having an opening centered about the optical axis which is smaller the backframe opening, is characterized in that the opening in the circuit board is located within the exposure chamber to make a peripheral edge of the opening serve as a light baffle for the backframe opening.

6 Claims, 3 Drawing Sheets

CAMERA WITH CIRCUIT BOARD HAVING LIGHT BAFFLE OPENING

FIELD OF THE INVENTION

The invention relates generally to the field of photography, and in particular to cameras. More specifically, the invention relates to a camera with a flash circuit board that has a light baffle opening.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a film take-up chamber, an unexposed film roll prewound from the film cartridge and onto a film spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge and advances an unexposed section of the filmstrip to a rear backframe (exposure) opening in the main body part. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the film take-up chamber. Then, he removes the exposed filmstrip from the film cartridge to develop the negatives and make prints for the customer. At least some of the used camera parts may be recycled, i.e. reused, to remanufacture the camera.

PROBLEM

Making the one-time-use camera more compact is an ever-present goal. The challenge to make the camera more compact especially involves the flash circuit board in the camera, because that component is relatively large.

Prior art U.S. Pat. No. 3,792,486 issued Feb. 12, 1974 is of interest in its disclosure of a camera-radio combination (not a one-time-use camera) comprising a front taking lens, an exposure chamber centered about an optical axis of the taking lens and having a front light-admitting opening behind the taking lens and a rear backframe opening for exposing successive sections of a filmstrip, and a printed circuit board located between the taking lens and the front light-admitting opening and having an apparently circular opening centered about the optical axis which is smaller the backframe opening. A front light-guiding tube is positioned in the opening in the circuit board, and a rear light-guiding tube defines the exposure chamber.

SUMMARY OF THE INVENTION

According to one aspect of the invention, a camera comprising a front taking lens, an exposure chamber centered about an optical axis of the taking lens and having a rear backframe opening for exposing successive sections of a filmstrip, and a circuit board located between the taking lens and the backframe opening and having an opening centered about the optical axis which is smaller the backframe opening, is characterized in that:

the opening in the circuit board is located within the exposure chamber to make a peripheral edge of the opening serve as a light baffle for the backframe opening.

According to another aspect of the invention, a camera comprising a front taking lens, a rear backframe opening centered about an optical axis of the taking lens for exposing successive sections of a filmstrip, and a circuit board located between the taking lens and the backframe opening and having an opening centered about the optical axis which is smaller than the backframe opening, is characterized in that:

the opening in the circuit board and the backframe opening each are rectangular shaped and have a similar aspect ratio to permit the opening in the circuit board to serve as a light baffle for the backframe opening.

According to another aspect of the invention, a method of assembling a camera that includes a front taking lens, an exposure chamber centered about an optical axis of the taking lens and having a rear backframe opening for exposing successive sections of a filmstrip, and a circuit board located between said taking lens and said backframe opening and having an opening centered about the optical axis which is smaller than the backframe opening, comprises:

locating the circuit board in the exposure chamber with the opening in the circuit board centered about the optical axis of the taking lens to make a peripheral edge of the opening serve as a light baffle for the backframe opening.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
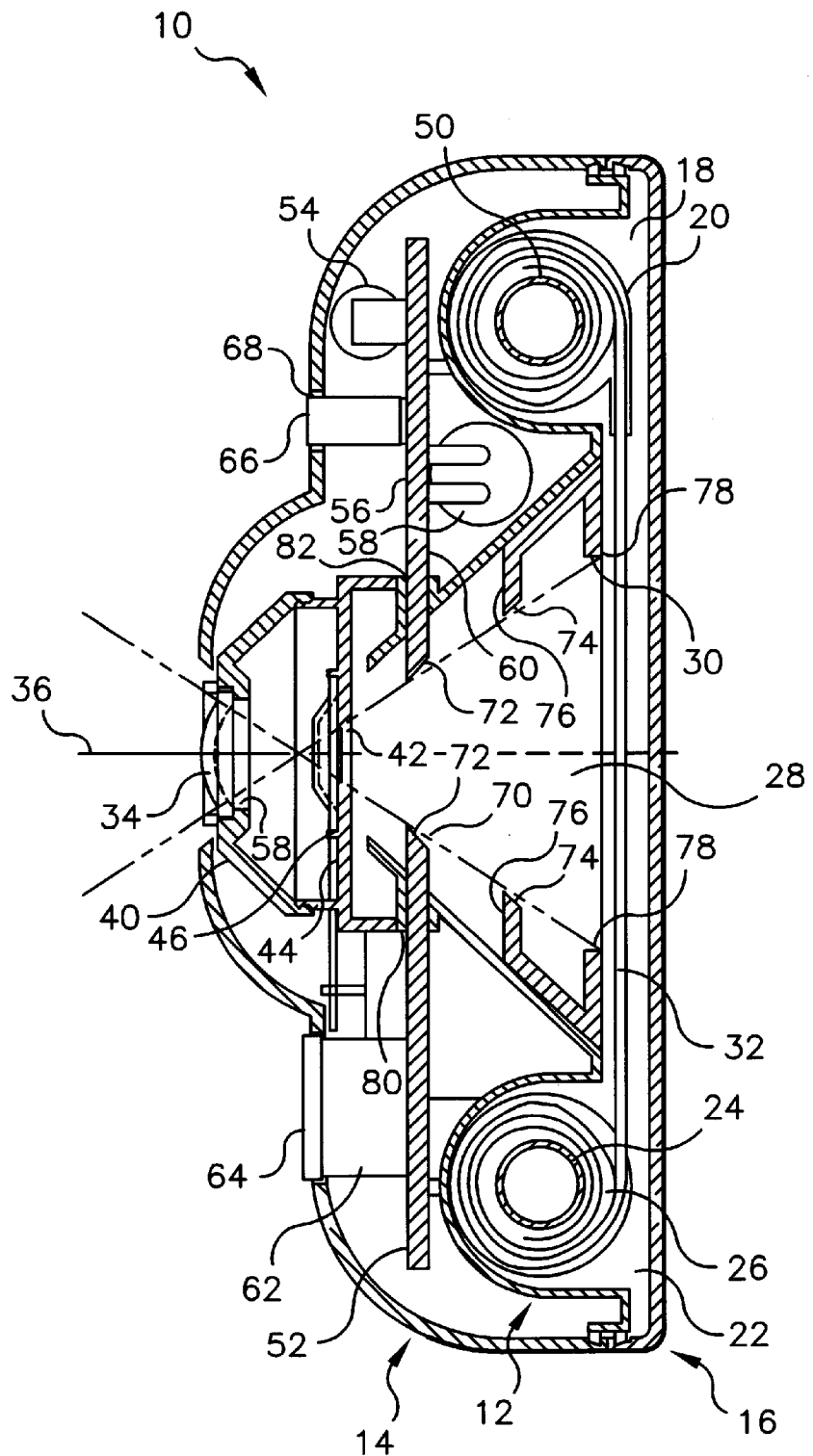
FIG. 1 is a plan sectional view of a one-time-use camera that is a preferred embodiment of the invention.
Figure 2:
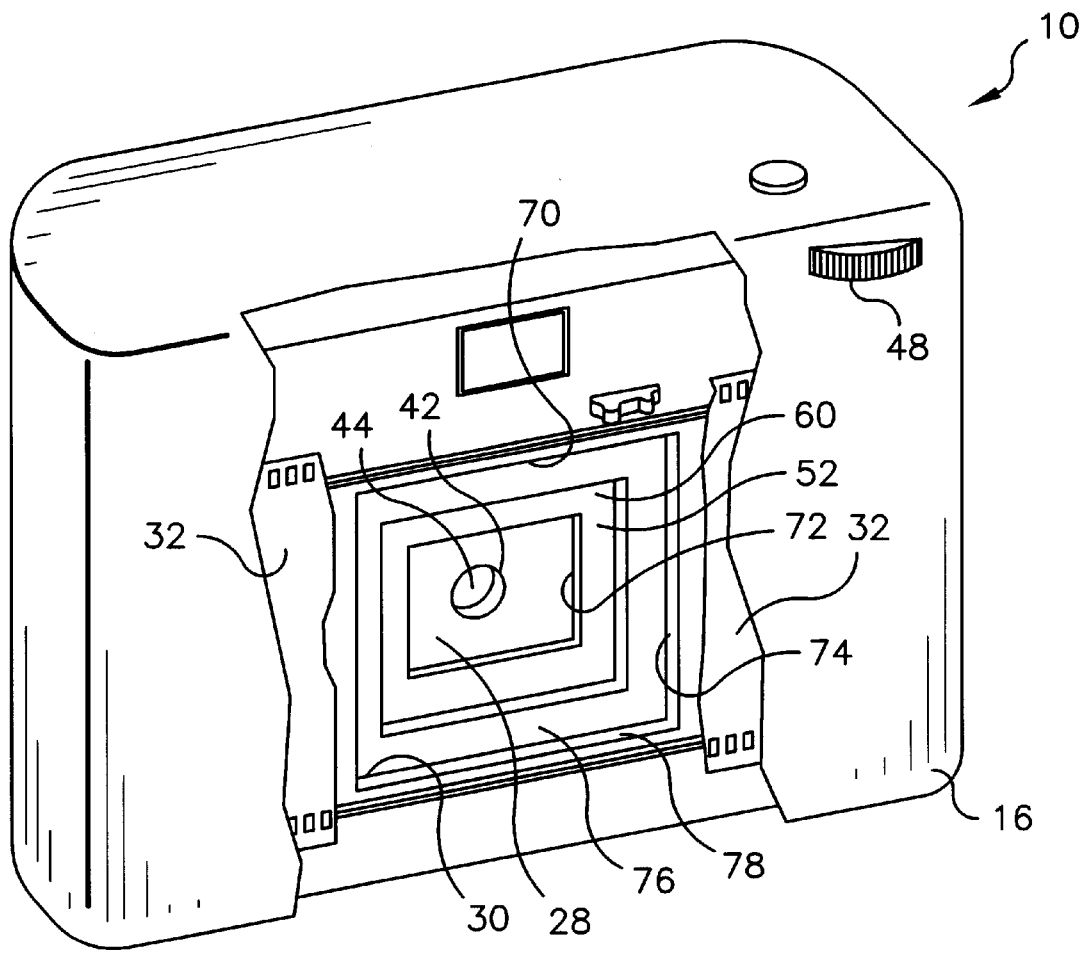
FIG. 2 is a rear perspective view of the camera, shown with a rear cover part removed.
Figure 3:
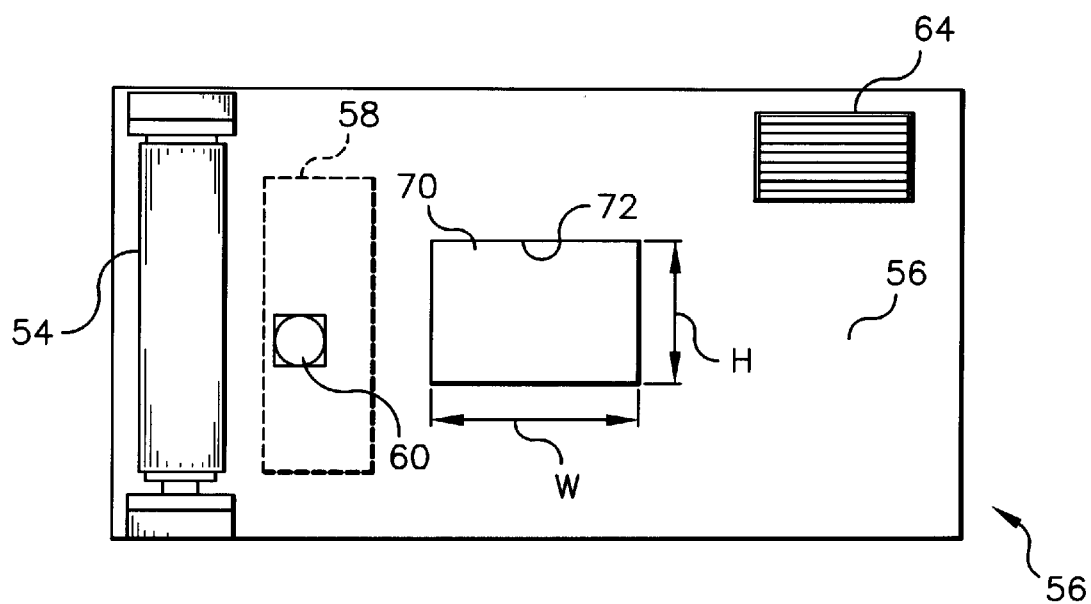
FIG. 3 is a front elevation view of a flash circuit board in the camera.

Referring now to the drawings, FIGS. 1–3 show a one-time-use camera 10 in which an opaque plastic main body part 12 is housed in a pair of opaque plastic front and rear cover parts 14 and 16. The front and rear cover parts 14 and 16 are connected to one another and to the main body part 12 via known hook-in-hole connections.

The main body part 12 has a rearwardly open film take-up chamber 18 which contains a conventional film cartridge 20, a rearwardly open film supply chamber 22 which contains a film spool 24 for an unexposed film roll 26, and an exposure chamber 28 with a rectangular-shaped rear backframe opening 30 that is located between the film take-up chamber and the film supply chamber for exposing successive imaging sections of a filmstrip 32. See FIGS. 1 and 2.

Looking at the camera 10 in FIG. 1, a known front taking lens 34 has an optical axis 36. A circular-shaped lens opening 38 in a lens support bezel 40 is centered about the optical axis 36. The exposure chamber 28 including the rear backframe opening 30 and a front circular-shaped light-admitting opening 42 to the exposure chamber is centered about the optical axis 36. A known shutter blade 44, between the lens opening 38 and the light-admitting opening 42, is mounted on a fixed pivot support pin 46 for opening and closing movement to expose successive imaging sections of a filmstrip 32 at the backframe opening 30.

A known film winding thumbwheel 48 is rotatably supported on the main body part 12 and has a depending coaxial stem (not shown) received in an end opening of a film spool 50 inside the film cartridge 20, to rotationally engage the film spool. Manual winding rotation of the thumbwheel 48 in a film winding direction (counter-clockwise in FIGS. 1 and 2) similarly rotates the film spool 50 inside the film cartridge 20 to wind each exposed section of the filmstrip 32 onto the film spool and to advance an unexposed section of the filmstrip to the rear backframe opening 30.

As shown in FIGS. 1 and 3, a flat rectangular-shaped flash circuit board 52 supports a battery 54 on its front side 56 and a capacitor 58 on its rear side 60. A known flash reflector 62 and a flash cover lens 64 which together house a known flash tube, not shown, are supported on the front side 56 of the flash circuit board 52. A manually depressible flash charge button 66 is supported on the front side 56 of the flash circuit board 52 and protrudes through an access opening 68 in the front cover part 14.

The flash circuit board 52 has a rectangular-shaped opening 70 that is centered about the optical axis 36 in the exposure chamber 28, is smaller than the rear backframe opening 30, and has a width W to height H ratio, i.e. an aspect ratio, that is the same as that of the backframe opening. See FIGS. 1–3. This permits a beveled peripheral edge 72 of the opening 70 to serve as a light baffle for the backframe opening 30. As shown in FIG. 1, the beveled peripheral edge 72 is aligned with a similar intermediate edge 74 of a rectangular-shaped protuberance or rib 76 in the exposure chamber 28. The intermediate edge 74, in turn, is aligned with a non-beveled peripheral edge 78 of the backframe opening 30.

To center the opening 70 in the flash circuit board 52 about the optical axis 36 in the exposure chamber 28, the flash circuit board is inserted through a pair of parallel slots 80 and 82 in the main body part 12.

The invention has been described with reference to a preferred embodiment. However, it will be appreciated that variations and modifications can be effected by a person of ordinary skill in the art without departing from the scope of the invention.

Parts List 10. camera
12. main body part
14. front cover part
16. rear cover part
18. film take-up chamber
20. film cartridge
22. film supply chamber
24. spool
26. unexposed film roll
28. exposure chamber
30. rear backframe opening
32. filmstrip
34. taking lens
36. optical axis
38. lens opening
40. lens support bezel
42. light-admitting opening
44. shutter blade
46. pivot support pin
48. film winding thumbwheel
50. film spool
52. flash circuit board
54. battery
56. front side
58. capacitor
60. rear side
62. flash reflector
64. flash cover lens
66. flash charge button
68. access opening
70. opening
W. width
H. height
72. peripheral edge
74. intermediate edge
76. protuberance or rib
78. peripheral edge
80. slot
82. slot

What is claimed is:

1. A camera comprising a front taking lens, an exposure chamber centered about an optical axis of said taking lens and having a rear backframe opening for exposing successive sections of a filmstrip, and a circuit board located between said taking lens and said backframe opening and having an opening centered about the optical axis which is smaller than said backframe opening, is characterized in that:

said opening in said circuit board is located within said exposure chamber to make a peripheral edge of the opening serve as a light baffle for said backframe opening.

2. A camera as recited in claim 1, wherein said opening in said circuit board and said backframe opening each are rectangular shaped and have a similar ratio of width to height.

3. A camera comprising a front taking lens, a rear backframe opening centered about an optical axis of said taking lens for exposing successive sections of a filmstrip, and a circuit board located between said taking lens and said backframe opening and having an opening centered about the optical axis which is smaller than said backframe opening, is characterized in that:

said opening in said circuit board and said backframe opening each are rectangular shaped and have a similar aspect ratio to permit the opening in said circuit board to serve as a light baffle for the backframe opening.

4. A camera as recited in claim 3, wherein an exposure chamber centered about the optical axis of said taking lens defines said rear backframe opening, and said opening in the circuit board is located within said exposure chamber.

5. A camera as recited in claim 4, wherein said exposure chamber has aligned slots, and said circuit board extends through said slots to locate said opening in the circuit board within said exposure chamber.

6. A method of assembling a camera that includes a front taking lens, an exposure chamber centered about an optical axis of the taking lens and having a rear backframe opening for exposing successive sections of a filmstrip, and a circuit board located between said taking lens and said backframe opening and having an opening centered about the optical axis which is smaller than the backframe opening, said method comprising:

locating the circuit board in the exposure chamber with the opening in the circuit board centered about the optical axis of the taking lens to make a peripheral edge of the opening serve as a light baffle for the backframe opening.

* * * * *